United States Patent
Hrinya et al.

(10) Patent No.: US 10,122,217 B2
(45) Date of Patent: Nov. 6, 2018

(54) IN-BAND SIGNALING WITHIN WIRELESS POWER TRANSFER SYSTEMS

(71) Applicant: Apple Inc., Cupertino, CA (US)

(72) Inventors: Stephen Hrinya, Cupertino, CA (US); Parin Patel, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 132 days.

(21) Appl. No.: 15/152,444

(22) Filed: May 11, 2016

(65) Prior Publication Data

US 2017/0093218 A1 Mar. 30, 2017

Related U.S. Application Data

(60) Provisional application No. 62/233,798, filed on Sep. 28, 2015, provisional application No. 62/255,072, filed on Nov. 13, 2015.

(51) Int. Cl.
| | | |
|---|---|---|
| *H01F 27/42* | (2006.01) | |
| *H01F 37/00* | (2006.01) | |
| *H01F 38/00* | (2006.01) | |
| *H02J 50/12* | (2016.01) | |
| *H02J 7/02* | (2016.01) | |
| *H02J 50/80* | (2016.01) | |

(52) U.S. Cl.
CPC ............. *H02J 50/12* (2016.02); *H02J 7/025* (2013.01); *H02J 50/80* (2016.02)

(58) Field of Classification Search
CPC ............. H02J 50/12; H02J 7/025; H02J 50/80
See application file for complete search history.

(56) References Cited

U.S. PATENT DOCUMENTS

| | | |
|---|---|---|
| 5,157,319 A | 10/1992 | Klontz et al. |
| 5,710,503 A | 1/1998 | Sideris et al. |
| 5,742,148 A | 4/1998 | Sudo et al. |
| 5,764,572 A | 6/1998 | Hammick |
| 5,821,731 A | 10/1998 | Kuki |
| 6,567,522 B1 | 5/2003 | Blackburn |
| 6,825,620 B2 | 11/2004 | Kuennen |
| 6,844,702 B2 | 1/2005 | Giannopoulos et al. |

(Continued)

FOREIGN PATENT DOCUMENTS

| | | |
|---|---|---|
| CA | 2489701 | 6/2006 |
| CN | 1653670 | 8/2005 |

(Continued)

OTHER PUBLICATIONS

U.S. Appl. No. 14/086,737, filed Nov. 21, 2013, Menzel et al.

(Continued)

*Primary Examiner* — Jared Fureman
*Assistant Examiner* — Esayas Yeshaw
(74) *Attorney, Agent, or Firm* — Brownstein Hyatt Farber Schreck, LLP

(57) ABSTRACT

Systems and methods for in-band communication across a wireless power interface from a load device to a source device. The load device selectively modifies the timing of switches within a voltage rectifier coupled to an output of a receive coil within the load device that receives power from a transmit coil within the source device. The source device detects changes in the power transfer (or in the relative timing of a voltage or a current) as digital information received from the load device.

20 Claims, 11 Drawing Sheets

(56) References Cited

U.S. PATENT DOCUMENTS

| | | | |
|---|---|---|---|
| 6,885,529 B2 | 4/2005 | Ker et al. | |
| 7,522,878 B2 | 4/2009 | Baarman | |
| 7,560,902 B2 | 7/2009 | Unger | |
| 7,605,496 B2 | 10/2009 | Stevens et al. | |
| 7,760,101 B2 | 7/2010 | Ales, III et al. | |
| 7,948,208 B2 | 5/2011 | Partovi et al. | |
| 7,952,322 B2 | 5/2011 | Partovi et al. | |
| 8,004,235 B2 | 8/2011 | Baarman | |
| 8,115,420 B2 | 2/2012 | Morooka et al. | |
| 8,129,864 B2 | 3/2012 | Baarman | |
| 8,169,185 B2 | 5/2012 | Partovi et al. | |
| 8,314,513 B2 | 11/2012 | Aoyama et al. | |
| 8,330,414 B2 | 12/2012 | Takahashi | |
| 8,441,244 B2 | 5/2013 | Bianco et al. | |
| 8,446,046 B2 | 5/2013 | Fells et al. | |
| 8,519,666 B2 | 8/2013 | Terao et al. | |
| 8,531,153 B2 | 9/2013 | Baarman et al. | |
| 8,629,652 B2 | 1/2014 | Partovi et al. | |
| 8,629,654 B2 | 1/2014 | Partovi et al. | |
| 8,890,470 B2 | 11/2014 | Partovi | |
| 8,896,264 B2 | 11/2014 | Partovi | |
| 8,901,881 B2 | 12/2014 | Partovi | |
| 8,928,276 B2 | 1/2015 | Kesler | |
| 8,933,594 B2 | 1/2015 | Kurs | |
| 8,942,624 B2 | 1/2015 | Singh et al. | |
| 8,947,042 B2 | 2/2015 | Kirby et al. | |
| 8,947,047 B2 | 2/2015 | Partovi et al. | |
| 9,000,620 B2 | 4/2015 | Kim et al. | |
| 9,018,898 B2 | 4/2015 | Ziv et al. | |
| 9,087,638 B2 | 7/2015 | Oettinger | |
| 9,106,083 B2 | 8/2015 | Partovi | |
| 9,112,362 B2 | 8/2015 | Partovi | |
| 9,112,363 B2 | 8/2015 | Partovi | |
| 9,112,364 B2 | 8/2015 | Partovi | |
| 9,178,369 B2 | 11/2015 | Partovi | |
| 9,178,387 B2 | 11/2015 | Mohammadian et al. | |
| 9,252,766 B2 | 2/2016 | Ren et al. | |
| 9,257,851 B2 | 2/2016 | Baarman | |
| 9,362,779 B2 | 2/2016 | Takahashi | |
| 9,276,437 B2 | 3/2016 | Partovi et al. | |
| 9,356,659 B2 | 5/2016 | Partovi | |
| 9,384,885 B2 | 7/2016 | Karalis et al. | |
| 9,407,109 B2 | 8/2016 | Takahashi et al. | |
| 9,496,733 B2 | 11/2016 | Van Funderburk | |
| 9,496,793 B2 | 11/2016 | Bruwer et al. | |
| 9,583,970 B2 | 2/2017 | Hsia et al. | |
| 9,716,402 B2 | 7/2017 | Kirby | |
| 2011/0050164 A1 | 3/2011 | Partovi et al. | |
| 2011/0121812 A1* | 5/2011 | Salvestrini | H05B 39/04 323/323 |
| 2011/0199045 A1 | 8/2011 | Hui et al. | |
| 2011/0221385 A1 | 9/2011 | Partovi et al. | |
| 2012/0068548 A1 | 3/2012 | Endo et al. | |
| 2012/0127765 A1* | 5/2012 | Maruyama | H02J 50/12 363/126 |
| 2013/0051083 A1* | 2/2013 | Zhao | H02J 50/12 363/17 |
| 2013/0093388 A1 | 4/2013 | Partovi | |
| 2013/0099563 A1 | 4/2013 | Partovi et al. | |
| 2013/0162051 A1 | 6/2013 | Michihata et al. | |
| 2013/0260676 A1* | 10/2013 | Singh | H04B 5/0037 455/41.1 |
| 2013/0260677 A1 | 10/2013 | Partovi | |
| 2013/0271069 A1 | 10/2013 | Partovi | |
| 2013/0285604 A1 | 10/2013 | Partovi | |
| 2013/0285605 A1 | 10/2013 | Partovi | |
| 2013/0300204 A1 | 11/2013 | Partovi | |
| 2014/0103873 A1 | 4/2014 | Partovi et al. | |
| 2014/0132210 A1 | 5/2014 | Partovi | |
| 2014/0191568 A1 | 7/2014 | Partovi | |
| 2014/0306654 A1 | 10/2014 | Partovi | |
| 2015/0061588 A1 | 3/2015 | Alves et al. | |
| 2015/0097443 A1 | 4/2015 | Moyer et al. | |
| 2015/0130412 A1 | 5/2015 | Partovi | |
| 2015/0137617 A1 | 5/2015 | Menzel et al. | |
| 2015/0137750 A1 | 5/2015 | Kirby et al. | |
| 2015/0194814 A1 | 7/2015 | Taylor et al. | |
| 2015/0244341 A1 | 8/2015 | Ritter et al. | |
| 2015/0280455 A1* | 10/2015 | Bosshard | H02J 5/005 307/104 |
| 2015/0303699 A1 | 10/2015 | Wagman et al. | |
| 2015/0341087 A1* | 11/2015 | Moore | H04B 5/0031 455/77 |
| 2016/0013714 A1* | 1/2016 | Young | H02M 3/33592 363/21.02 |
| 2016/0056662 A1 | 2/2016 | Yoon | |
| 2016/0094074 A1 | 3/2016 | Alves et al. | |
| 2016/0126775 A1 | 5/2016 | Park et al. | |
| 2016/0134134 A1 | 5/2016 | Baarman et al. | |
| 2017/0272058 A1 | 9/2017 | Menzel et al. | |
| 2017/0288467 A1 | 10/2017 | Hrinya et al. | |

FOREIGN PATENT DOCUMENTS

| | | |
|---|---|---|
| CN | 101621220 | 1/2010 |
| CN | 101902062 | 12/2010 |
| CN | 102934319 | 2/2013 |
| CN | 103427499 | 12/2013 |
| JP | H0767263 | 3/1995 |
| JP | 2010213414 | 9/2010 |
| JP | 2012005238 | 1/2012 |
| JP | 2013169081 | 8/2013 |
| KR | 20100110356 | 10/2010 |
| KR | 1020130106840 | 9/2013 |
| WO | WO 08/044875 | 4/2008 |
| WO | WO 11/102901 | 8/2011 |
| WO | WO 13/090565 | 6/2013 |
| WO | WO 13/142720 | 9/2013 |

OTHER PUBLICATIONS

U.S. Appl. No. 14/468,995, filed Aug. 26, 2014, Alves et al.
U.S. Appl. No. 14/503,363, filed Sep. 30, 2014, Moyer et al.
U.S. Appl. No. 14/503,366, filed Sep. 30, 2014, Alves et al.
Zhusheng et al., "Design and Application of Wireless Charging Technology for Electric Vehicle," Electric Age, May 31, 2012, vol. 5, pp. 26-28 (10 pages with translation).
Johns et al., "Designing a Qi-compliant receiver coil for wireless power systems, Part 1," Texas Instruments Incorporated, High-Performance Analog Products, *Analog Applications Journal*, www.ti.com/aaj, 3Q 2012, 9 pages.
"System Description Wireless Power Transfer," vol. I: Low Power, Part 1: Interface Definition, Version 1.0.1, Wireless Power Consortium, Oct. 2010, 86 pages.
"System Description Wireless Power Transfer," vol. I: Low Power, Part 1: Interface Definition, Version 1.1.1, Wireless Power Consortium, Jul. 2012, 247 pages.
U.S. Appl. No. 15/626,989, filed Jun. 19, 2017, Hrinya et al.
"Benefits of Optical Communications," NASA, published May 6, 2014, accessed online Feb. 24, 2017, https://www.nasa.gov/directorates/heo/scan/engineering/technology/txt_opticalcomm_benefits.html, 3 pages.

\* cited by examiner

IN-BAND SIGNALING WITHIN WIRELESS POWER TRANSFER SYSTEMS

CROSS-REFERENCE TO RELATED APPLICATIONS

This application is a nonprovisional patent application of, and claims the benefit to, U.S. Provisional Patent Application No. 62/233,798, filed Sep. 28, 2015, and titled "In-Band Signaling Within Wireless Power Transfer Systems," and to U.S. Provisional Patent Application No. 62/255,072, filed Nov. 13, 2015, and titled "In-Band Signaling Within Wireless Power Transfer Systems," the disclosures of which are hereby incorporated herein in their entirety.

FIELD

Embodiments described herein relate to wireless power transfer systems, and more particularly, to in-band signaling across wireless power transfer systems.

BACKGROUND

An electronic device can receive power from a wireless power transmitter. In one example, a power transmitter circulates a varying current through an electromagnetic coil to induce a voltage across the terminals of a magnetically coupled corresponding coil within an electronic device, thereby inducing a current useful to the electronic device inversely proportional to the impedance of the device at that time. In a typical example, the electronic device directs the induced current to a circuit configured to recharge a battery or power a load.

Some conventional electronic devices send data back to the power transmitter by selectively changing their effective impedance; changes in the operating point are monitored by the wireless power transmitter to recover the data. However, the rate at which data can be sent in this manner is low.

SUMMARY

Many embodiments described herein generally reference systems and methods for in-band signaling from a load device to a source device of a wireless power transfer system. The wireless power transfer system can be modeled as an air gap transformer; the source device includes a primary coil and the load device includes a secondary coil. The primary coil and the secondary coil are magnetically coupled such that when an alternating current is applied to the primary coil, an alternating voltage is induced across the terminals of the secondary coil.

The induced voltage may be rectified by a synchronous rectifier within the load device. To communicate with the source device, the load device selectively modifies the timing of one or more switches of the synchronous rectifier during transitions between half-cycles of the alternating voltage, thereby causing a reduction in the received power in the load device (e.g., power is reflected from the load device to the source device).

The source device detects the reflected power from the load and records, caches, and/or buffers the presence of the detected reflected signal as digital information. Alternatively, should the source device detect the absence of any reflected power, the source device records the absence of a reduction in power transfer as a complementary digital bit.

The source device records, caches, and/or buffers recorded bits until a symbol, instruction, header, or other data is received.

BRIEF DESCRIPTION OF THE FIGURES

Reference will now be made to representative embodiments illustrated in the accompanying figures. It should be understood that the following descriptions are not intended to limit the disclosure to a limited set of preferred embodiments. To the contrary, it is intended that the following description covers alternatives, modifications, and equivalents as may be included within the spirit and scope of the described or depicted embodiments and as defined by the appended claims.

The use of the same or similar reference numerals in different figures indicates similar, related, or identical items.

Figure 1:
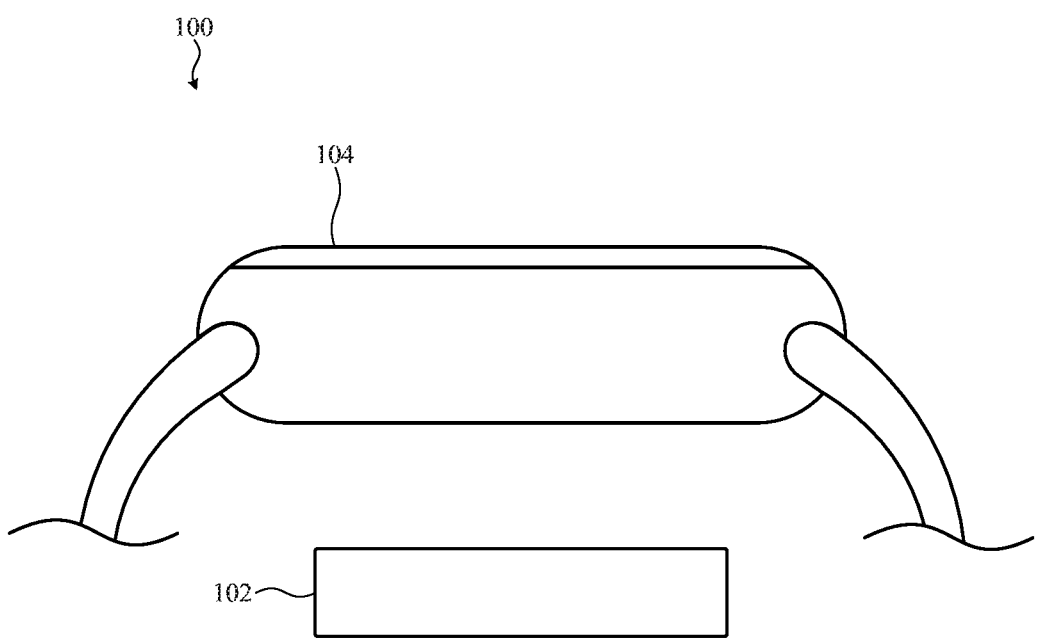
FIG. 1 depicts a load device and a source device of a wireless power transfer system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein generally reference systems and methods for in-band signaling from a load device to a source device of a wireless power transfer system. In one example, a wireless power transfer system such as described herein can be an electromagnetic inductive power transfer system, operating at a selected frequency (herein, the "operational frequency" of the wireless power transfer system) in a non-resonant mode or a resonant mode.

In many embodiments, digital information is transferrable from the load device to the source device via in-band signaling at a baud rate equivalent to, or a multiple or factor of, the operational frequency of the wireless power transfer system. In these embodiments, the load device selectively modifies the timing of (e.g., delays) the turn-off of one or more switches of a synchronous rectifier during a transition from a positive current half-cycle to a negative current half-cycle, thereby causing current to reverse, leading to a momentary reduction in the power transferred from the source device to the load device.

The source device detects said current reversal (and corresponding reflected power) and records the presence of the current reversal as a digital bit. Alternatively, should the source device detect the absence of any negative current, the source device records the absence of a current reversal as a complementary digital bit. The source device can use, collect, store, forward, or ignore received bits in any number of suitable ways. In one embodiment, the source device buffers recorded bits until a symbol, instruction, header, checksum, an end-of-message indication, or other data is received. Thus, by selectively desynchronizing the rectification circuit (by means of delaying the turn-off) on a per half-cycle basis, the load device communicates digital information to the source device.

In-band signaling such as described herein is substantially independent of the load conditions (e.g., impedance) of the load device because the presence or absence of a current reversal occurs during transitions between half-cycles of the fluctuating magnetic field used by the source device to convey power to the load device.

For many embodiments described herein, the presence or absence of the current reversal is recorded as a binary bit (e.g., present or not present), however such a configuration is not required of all embodiments. For example, the delayed turn-off of the synchronous rectifier switch(es) can affect a phase shift in the current through the source device; the source device can monitor for such a phase shift and record the phase shift as a binary bit. In other cases, the source device can monitor the magnitude of the reduction in the power transferred between the source device and the load device (e.g., current monitoring, voltage monitoring, phase shift monitoring, and so on) and can quantize the same into one or more non-binary values.

These and other embodiments are discussed below with reference to FIGS. 1-12. However, those skilled in the art will readily appreciate that the detailed description given herein with respect to these Figures is for explanatory purposes only and should not be construed as limiting.

Referring now to FIG. 1, there is shown a wireless power transfer system including a load device and a source device in an unmated configuration. The illustrated embodiment depicts a source device 102 that is configured to wirelessly transfer energy to a load device 104.

In many examples, the load device 104 may include a processor coupled with, or in communication with a memory, one or more communication interfaces, output devices such as displays and speakers, one or more sensors, such as biometric and imaging sensors, and input devices such as one or more buttons, one or more dials, a microphone, and/or force or touch sensing device. The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces.

Although the load device 104 illustrated in FIG. 1 depicts a wristwatch or smart watch, any electronic device may be suitable to receive energy from the source device 102. For example, a suitable electronic device may be any portable or semi-portable electronic device that may receive energy inductively (herein, generally, a "load device"), and a suitable transmitting device may be any portable or semi-portable docking station or charging device that may transmit energy inductively (herein, generally, a "source device"). Example electronic devices include, but are not limited to, a telephone, a gaming device, a wearable device, a digital music player, a tablet computing device, a laptop computing device, and other types of portable and consumer electronic devices that are configured to transmit and/or receive energy inductively.

The source device 102 and the load device 104 may each respectively include a housing to enclose, support, and carry electronic, mechanical and structural components therein. In many examples, and as depicted, the load device 104 may have a larger lateral cross section than that of the source device 102, although such a configuration is not required. In other examples, the source device 102 may have a larger lateral cross section than that of the load device 104. In still further examples, the cross sections may be substantially the same. And in other embodiments, the source device can be adapted to be inserted into a charging port in the load device.

The source device 102 may be connected to a power source by cord or connector. For example, the source device 102 can receive power from a wall outlet, or from another electronic device through a connector, such as a USB connector. Additionally or alternatively, the source device 102 may be battery operated. Similarly, although the illustrated embodiment is shown with the connector coupled to the housing of the source device 102, the connector may be connected by any suitable means. For example, the connector may be removable and may include a connector that is sized to fit within an aperture or receptacle opened within the housing 106 of the source device 102.

The load device 104 may include a bottom surface that may interface with, align or otherwise contact a top surface of the source device 102. In this manner, the load device 104 and the source device 102 may be positionable with respect to each other. In certain embodiments, the top surface of the source device 102 may be configured in a particular shape that mates with a complementary shape of the load device 104. The illustrative top surface may include a concave shape that follows a selected curve. The bottom surface of the load device 104 may include a convex shape following the same or substantially similar curve as the top surface.

In other embodiments, the surfaces can have any given shape and dimension. For example, the surfaces may be substantially flat. Additionally or alternatively, the source and load devices 102, 104 can be positioned with respect to each other using one or more alignment mechanisms. As one example, one or more magnetic devices may be included in the source and/or load devices and used to align the source and load devices. In another example, one or more actuators in the source and/or load devices can be used to align the source and load devices. And in yet another example, alignment features, such as protrusions and corresponding indentations in the housings of the source and load devices, may be used to align the source and load devices. The design or configuration of the surfaces, one or more alignment mechanisms, and one or more alignment features can be used individually or in various combinations thereof.

Figure 2:
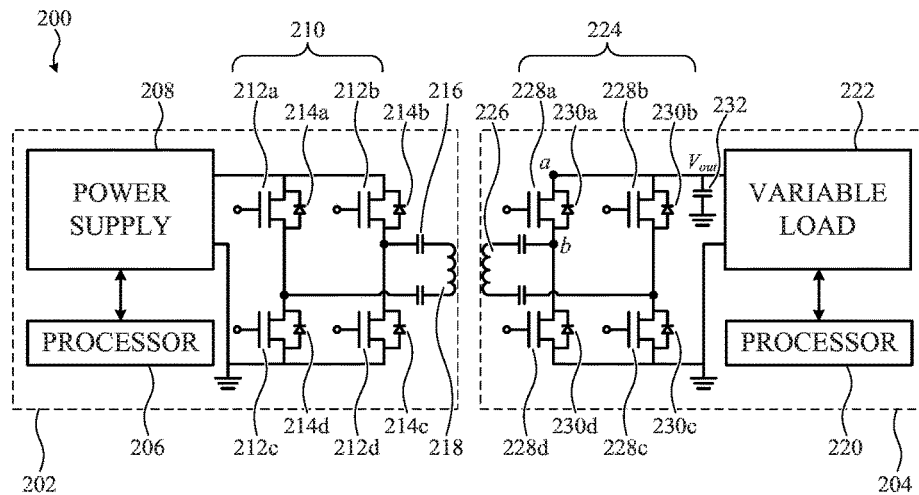
FIG. 2 depicts a simplified schematic diagram of a wireless power transfer system configured for in-band signaling.

FIG. 2 depicts a simplified schematic diagram of a wireless power transfer system configured for in-band signaling. The schematic illustrated may represent a wireless power transfer system such as shown in FIG. 1. The wireless power transfer system 200 includes a source device 202 for transmitting power and a load device 204 for receiving power, illustrated as coupled by two electrically-isolated halves of an air-gap transformer.

Initially, reference is made to the circuit topology of the illustrated example embodiment. It is appreciated that the particular illustrated embodiment and schematic diagram is merely an example; other circuit topologies including a greater number or a fewer number of elements and/or connections between elements is possible.

The source device 202 includes a processor 206 and a power supply 208. The processor 206 may be implemented as any electronic device or combination of electronic devices capable of processing, receiving, or transmitting data or instructions. For example, the processor 206 may include one or more of a microprocessor, a central processing unit, an application-specific integrated circuit, a digital signal processor, a voltage or current comparator circuit, a phase comparator circuit, an analog circuit, or any other combinations of such devices. As described herein, the term "processor" is meant to encompass a single processor or processing unit, multiple processors, multiple processing units, or other suitably configured computing element(s). The power supply 208 can be an internal or external power source.

The processor 206 is configured to control an inverter 210 that is coupled to the output of the power supply 208. The inverter 210 converts the direct current output from the power supply 208 into an alternating current. The processor 206 controls the frequency at which the inverter 210 alternates the current and the timing of the operation of switches associated with the inverter 210, such as the inverter switches 212a, 212b, 212c, and 212d.

Figure 3A:
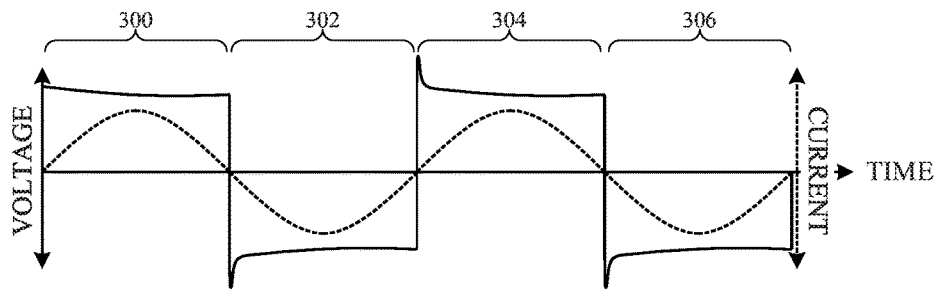
FIG. 3A is a waveform representation of current and voltage of a primary coil of the wireless power transfer system depicted in FIG. 2.

The inverter 210 can be formed as any suitable type of a direct current to alternating current converter. The inverter 210 can output alternating current in any suitable manner, such as a square wave, a sine wave, or any other alternating current waveform. One example waveform output from the inverter 210 is shown in FIG. 3A, depicting current and voltage measured across the output of the inverter 210 of the wireless power transfer system of FIG. 2. Depicted are two periods of alternating current: a positive half-cycle 300, a negative half-cycle 302, a second positive half-cycle 304, and a second negative half-cycle 306. The voltage output from the inverter 210 in the depicted waveform is substantially similar to a square wave; deformations in the substantially square waveform depicted represent losses introduced by the inverter 210.

The inverter 210 can be constructed as an H-bridge. In this example, the inverter 210 is formed from four transistors (or, more generally, switches) arranged in pairs of two, identified in the illustrated embodiment as the inverter switches 212a, 212b, 212c, and 212d. The first pair includes inverter switches 212a and 212d and the second pair includes inverter switches 212b and 212c. The pairs of switches define two separate and inverse electrical paths between the power supply 208 and an electromagnetic coil, identified as the primary coil 216. The processor 206 alternates which electrical path couples the power supply 208 to the primary coil 216. In many examples, the processor 206 alternates the power to the primary coil 216 at a frequency selected so that the primary coil 216 and the associated capacitors 218 resonate.

In some embodiments, the inverter switches 212a, 212b, 212c, and 212d can each be associated with an inverter diode, respectively labeled as the inverter diodes 214a, 214b, 214c, and 214d. The inverter diodes 214a, 214b, 214c, and 214d are placed across the respective source and drain of the inverter switches 212a, 212b, 212c, and 212d such that one inverter diode is associated with each inverter switch. In some embodiments, the inverter diodes 214a, 214b, 214c, and 214d can be discrete and separate elements from the inverter switches, although this is not required. For example, in one embodiment the inverter diodes 214a, 214b, 214c, and 214d are implemented as body diodes within the inverter switches. In other examples, the inverter diodes can be implemented as external diodes, such as Schottky diodes. The inverter diodes 214a, 214b, 214c, and 214d of the inverter switches 212a, 212b, 212c, and 212d can be used as supplemental current paths during the operation of the inverter 210. More specifically, in certain embodiments, the inverter 210 may briefly pause between switching between the two separate and inverse electrical paths. This "dead time" between inverter cycles may be included in order to prevent "shoot-through" current which may occur if the inverter switches 212a, 212c (or, respectively, the inverter switches 212b, 212d) are in the on-state at the same time. In other words, the shoot-through condition may occur if the turn-off of the active switch pair is slower than the turn-on of the active switch pair of the next inverter cycle, thereby effectively shorting the power supply 208 for a brief period of time. During the dead time between inverter cycles, current within the primary coil 216 may be conducted through one or more of the inverter diodes 214a, 214b, 214c, and 214d, thereby preventing said current from causing damage to one or more of the inverter switches 212a, 212b, 212c, and 212d during the dead time period. As may be appreciated, the voltage across an inverter diode may increase rapidly when said diode begins conducting current during a dead time period. The forward voltage of the conducting diodes may be observed as a voltage spike when measured across the primary coil 216, for example as shown in FIG. 3A.

The load device 204 includes a processor 220 and a variable load 222. As with the processor of the source device 202, the processor 220 may be implemented as any electronic device or combination of electronic devices capable of processing, receiving, or transmitting data or instructions. For example, the processor 220 may include one or more of a microprocessor, a central processing unit, an application-specific integrated circuit, a digital signal processor, an analog circuit, or any other combinations of such devices.

The variable load 222 can be any circuit or network of circuits within the load device 204 that require direct current to operate. For example, the variable load 222 may include one or more communication interfaces, output devices such as displays and speakers, one or more sensors, such as biometric and imaging sensors, one or more batteries, and input devices such as one or more buttons, one or more dials, a microphone, and/or force or touch sensing device.

The processor 220 is configured to control a synchronous rectifier 224 that is coupled to the terminals of an electromagnetic coil, identified as the secondary coil 226. The synchronous rectifier 224 converts alternating induced in the secondary coil 226 into a direct current useful to the load device 204. The processor 220 controls the switches of the synchronous rectifier 224. Typically, the synchronous rectifier 224 operates at the resonance frequency of the primary coil 216 and the associated capacitors 218. The output of the synchronous rectifier can be coupled to an output capacitor 232 which serves as a low-pass filter. The output capacitor 232 filters out high frequency components of the output of the synchronous rectifier into a direct-current voltage useful to the variable load 222.

The synchronous rectifier 224 is formed from four transistors (or, more generally, switches) arranged in pairs of two, identified as the rectifier switches 228a, 228b, 228c, and 228d. The first pair includes rectifier switches 228a and 228c and the second pair includes rectifier switches 228b and 228d. The pairs of switches define two separate and inverse electrical paths between the secondary coil 226 and the variable load 222. The processor 220 alternates which electrical path couples the secondary coil 226 to the variable load 222.

In some embodiments, the synchronous rectifier 224 includes four rectifying diodes 230a, 230b, 230c, and 230d. The rectifying diodes 230a, 230b, 230c, and 230d are placed across the respective source and drain of the rectifier switches 228a, 228b, 228c, and 228d such that the rectifying diode 230a is coupled the source and drain of the rectifier switch 228a, the rectifying diode 230b is coupled the source and drain of the rectifier switch 228b, and so on. In some embodiments, the rectifying diodes can be discrete and separate elements from the rectifier switches, although this is not required. For example, in many embodiments the rectifying diodes are implemented as body diodes within the rectifier switches. In other embodiments, the rectifying diodes may be implemented with separate diodes, such as Schottky diodes. In some embodiments, the rectifying diodes are used in lieu of the synchronous rectifier switches until the load device 204 is capable to provide a voltage sufficient to switch the rectifying switches (e.g., when the load device 204 is in a low-power mode). In another non-limiting phrasing, the rectifying diodes can be used as an asynchronous rectifier.

Next, reference is made to the operation of transferring power from the source device to the load device of the example embodiment illustrated in FIG. 2. As noted above, it is appreciated that the operation of the particular illustrated embodiment and schematic diagram is a generalized and simplified to facilitate an understanding of the various embodiments described herein; other circuit topologies can operate in a different manner than that described below.

In operation, the source device 202 circulates a time-varying current through the primary coil 216 that generates a time-varying magnetic flux in response. The secondary coil 226, within the load device 204, is placed nearby the source device 202 so that the primary coil 216 and the secondary coil 226 are magnetically coupled. In this manner, the time-varying magnetic flux generated by the primary coil 216 induces an alternating voltage across the terminals of the secondary coil 226 resulting in an alternating current through operational components of the load device 204 related to the impedance of the variable load 222.

As noted above, the synchronous rectifier 224 includes four transistors (or, more generally, switches) arranged as pairs of two. One pair of switches, including the rectifier switches 228a and 228c, define an electrical path between the positive terminal of the secondary coil 226 and a positive voltage input terminal of the variable load 222 when the alternating voltage across the secondary coil 226 is positive, which occurs for one half of each period of the alternating voltage (herein, the "positive half-cycle"). During the positive half-cycle, current circulates from the positive terminal of the secondary coil 226, through the variable load 222 and the output capacitor 232, to the negative terminal of the secondary coil 226.

The synchronous rectifier 224 also includes a second pair of switches, the rectifier switches 228b and 228d, that define an electrical path between the negative terminal of the secondary coil 226 and the positive voltage input terminal of the variable load 222 when the alternating voltage across the secondary coil 226 is negative, which, like the positive half-cycle, occurs for one half of each period of the alternating voltage (herein, the "negative half-cycle"). During the negative half-cycle, current circulates from the negative terminal of the secondary coil 226, through operational components of the load device 204, to the positive terminal of the secondary coil 226.

In operation, the processor 220 of the load device 204 activates the rectifier switches 228a and 228c for each positive half-cycle (herein, the "positive half-cycle pair" of switches) and the rectifier switches 228b and 228d for each negative half-cycle (herein, the "negative half-cycle pair" of switches). In this manner, alternating voltage is rectified to a positive voltage $V_{out}$ and alternating current is rectified and (optionally) filtered by the output capacitor 232 to provide direct current useful to operate the variable load 222.

In operation, the voltage across the rectifying diodes 230a, 230b, 230c, and 230d can be used by the processor 220 as a trigger to activate the switches of a particular half-cycle pair. In this manner, the synchronous rectifier 224 remains closely synchronized to the frequency and phase of the alternating voltage induced across the terminals of the secondary coil 226.

More specifically, when the induced current in the secondary coil 226 changes from negative to positive, the rectifying diodes 230a and 230c conduct to carry the current at the start of the positive half-cycle. The forward voltage across the rectifying diodes 230*a* and/or 230*c* can be sensed and used as a trigger to activate the rectifier switches 228*a* and 228*c*. After the synchronous rectifier switches are turned on, the associated rectifying diodes no longer carry current (e.g., substantially all current flows through the switch instead). In this manner, controlling the time at which the rectifier switches turn on controls whether voltage across the secondary coil 226 spikes (e.g., rapidly increases) at the initial part of the positive half cycle. The amplitude of this voltage spike is the forward voltage of the rectifier diode and the width is the delay from detection of the diode forward voltage to the activation of the corresponding rectifier switch (see, e.g., FIG. 3B). A similar voltage spike can be observed on the other side of the secondary coil 226 across the source and drain of the rectifierer switch 228*c*.

Similarly, as the voltage of a negative half-cycle exceeds the threshold voltage of the rectifying diodes 230*b* and 230*d*, said diodes begin conducting current, resulting in a rapid increase in voltage across the rectifier switches 228*b* and 228*d*. In other words, voltage measured across the source and drain of the rectifying switch 228*b* spikes during the initial part of a negative half-cycle as a result of current flowing through the rectifying diode 230*b*. As the induced current in the secondary coil 226 changes from positive to negative the rectifying diodes 230*b* and 230*d* conduct to carry the current at the start of the negative half-cycle. The forward voltage across the rectifying diodes 230*b* or 230*d* can be sensed and used as a trigger to activate the rectifier switches 228*b* and 228*d*. A voltage spike may be seen at the initial part of the negative half cycle during the time that the rectifying diodes 230*b* and 230*d* are conducting current. A similar voltage spike can be measured across the source and drain of the rectifying switch 228*d*.

These voltage spikes are generally referred to herein as "leading edge spikes" of the voltage measured across either (or both) of the two switches of a half-cycle pair. The processor 220 monitors for the leading edge spike and upon detecting the same, activates the respective half-cycle transistor pair to direct the current associated with that half-cycle to the variable load 222.

Once a half-cycle pair is activated by the processor 220, voltage across the diodes settles back to the root mean-squared voltage output from the synchronous rectifier 224, identified in the schematic diagram as $V_{out}$.

Near the end of a half-cycle (e.g., approaching a transition between a positive half-cycle and a negative half-cycle, detected by current monitoring, voltage monitoring, phase synchronization, or any other suitable process), the processor 220 disables the switches associated with the then-active half-cycle pair. Provided that the switch is disabled prior to the time at which the current through the secondary coil reaches zero, current within the circuit flows only through the diodes of the recently-active half-cycle pair, resulting once again in a spike in voltage. Such a voltage spike is referred to herein as a "trailing-edge spike." The amplitude of this voltage spike is the forward voltage of the rectifier diode and the width is the delay from the turn-off of the rectifier switch until the current through the secondary coil 226 reaches zero.

More specifically, as the current of a positive half-cycle decreases toward zero, the processor 220 disables the rectifier switches 228*a* and 228*c*. Thereafter, remaining current in the circuit flows through the rectifying diodes 230*a* and 230*c*, resulting in an increase in voltage because of the forward voltage exhibited by the diodes. In other words, voltage measured from node a to node b in the illustrated schematic (e.g., across the source and drain of the rectifying switch 228*a*) spikes as a result of current flowing through the rectifying diode 230*a*. A similar voltage spike can be measured across the source and drain of the rectifying switch 228*c*.

Similarly, as the current of a negative half-cycle increases toward zero, the processor 220 disables the rectifier switches 228*b* and 228*d*. Thereafter, current in the circuit flows through the rectifying diodes 230*b* and 230*d*, resulting in a rapid increase in voltage across the rectifier switches 228*b* and 228*d* because of the forward voltage exhibited by the diodes.

Figure 3B:
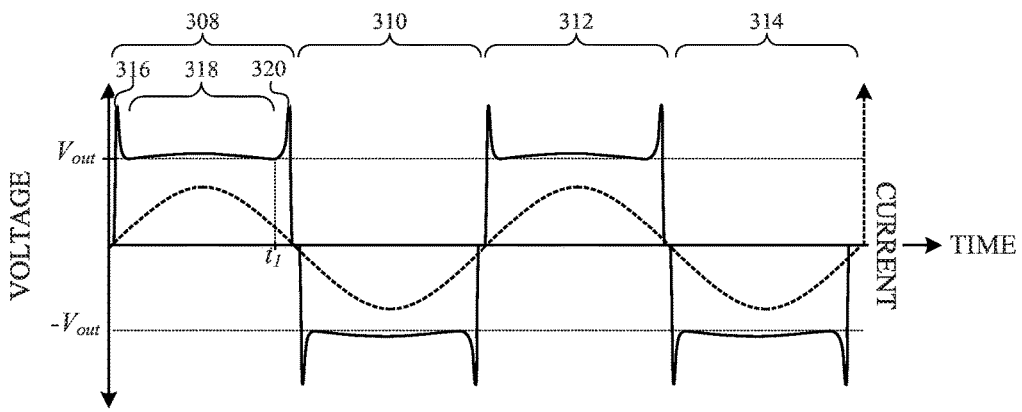
FIG. 3B is a waveform representation of current and voltage of a secondary coil of the wireless power transfer system depicted in FIG. 2.

More simply, in operation, the voltage across the source and drain of the rectifier switches 228*a*, 228*b*, 228*c*, and 228*d*, when measured over a half-period, exhibits a leading edge voltage spike, a substantially flat conducting period, and a trailing-edge voltage spike, such as depicted in FIG. 3B, which is a waveform representation of current and voltage measured across the output of the secondary coil 226 of the wireless power transfer system 200 of FIG. 2. Depicted in FIG. 3B are two periods of induced alternating current and alternating voltage prior to rectification by the synchronous rectifier 224: a positive half-cycle 308, a negative half-cycle 310, a second positive half-cycle 312, and a second negative half-cycle 314. The voltage of each half-cycle exhibits a leading edge voltage spike 316, a substantially flat conducting period 318, and a trailing-edge voltage spike 320 that generally begins at time $t_1$. The substantially flat conducting period 318 is illustrated as slightly deformed to represent a slight increase in voltage resulting from internal resistance of the rectifier switches 228*a*, 228*b*, 228*c*, and 228*d*.

Next, reference is made to the operation of the circuit of the example embodiment illustrated in FIG. 2 as it relates to in-band signaling from the load device. As noted above with respect to other example embodiments, it is appreciated that the operation of the particular illustrated embodiment and schematic diagram is a generalized to facilitate an understanding of the various embodiments described herein; other circuit topologies can operate in a different manner to affect in-band signaling from the load device to the source device than that described below.

For many embodiments described herein, digital information is transferrable from the load device 204 to the source device 202 via in-band signaling at a baud rate equivalent to, or a multiple (or factor) of, the operational frequency of the wireless power transfer system 200. In general, in these embodiments, the processor 220 of the load device 204 selectively modifies the timing of (e.g., delays) one or more switches of the synchronous rectifier 224 during a transition between half-cycles, thereby suppressing the trailing-edge voltage spike that results from the conduction of current by the rectifying diode(s) associated with the switches. This delay allows the induced current through the secondary coil 226 to invert (e.g., change sign), reversing direction, while the conducting rectifier switch is active. This, in turn, causes power to be reflected to the source device 202.

In another non-limiting phrasing, the baud rate (e.g., the number of bits sent per second) may be related to the operational frequency of the wireless power transfer system 200 specifically because data is communicated from the load device 204 to the source device 202 within the same band (e.g., not requiring a separate communication channel and not requiring high-frequency modulation and subsequent demodulation) as the power transfer. In one example, a single bit can be transmitted for every half-cycle of induced voltage; the baud rate may be twice the operational frequency. In another example, two bits can be transmitted for every half-cycle (e.g., by modification of the timing by different amounts) of induced voltage; the baud rate may be four times the operational frequency. In yet another example, a single bit may be transmitted for every five periods of induced voltage; the baud rate may be 20 percent of the operational frequency. In yet another example, a single bit may be transmitted only for the falling edge of induced voltage; the baud rate may be equal to the operational frequency. It may be appreciated that the examples provided above are presented merely to facilitate an understanding of various embodiments described herein; different encoding schemes, different operational frequencies, different encryption techniques, different error checking methods, and so on can be used in different embodiments to achieve different baud rates that may be suitable for specific implementations.

Figure 4A:
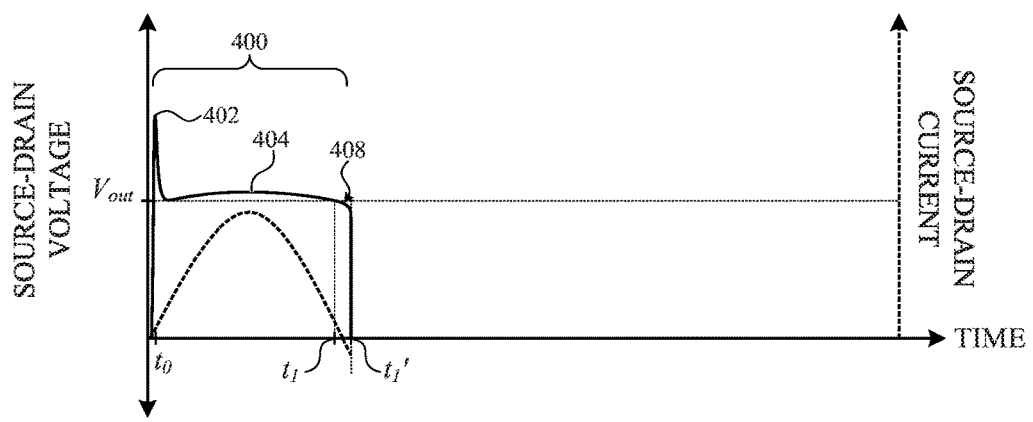
FIG. 4A is a waveform representation of current and voltage of a rectifying switch coupled to the secondary coil of the wireless power transfer system depicted in FIG. 2, particularly illustrating suppression of a trailing-edge voltage spike.
Figure 4B:
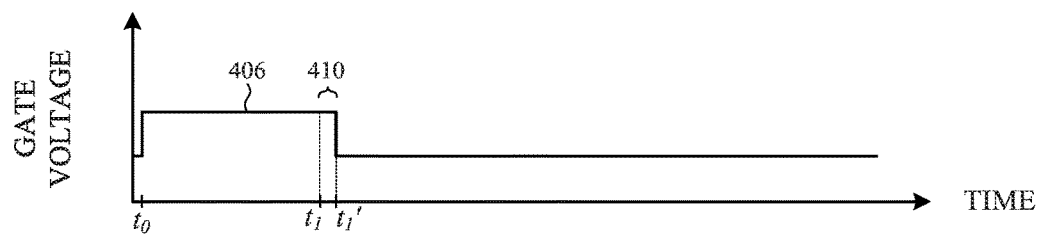
FIG. 4B is a timing diagram depicting gate voltage control of a transistor associated with FIG. 4A.

Particularly, FIG. 4A is a waveform representation of a single half-cycle 400 of current and voltage associated with the rectifier switch 228a during a de-synchronization operation performed by the synchronous rectifier 224. Depicted in FIG. 4B is a control signal 406 that may be applied to the rectifier switch 228a (e.g., gate voltage signal) to affect the de-synchronization. The voltage waveform of FIG. 4A includes a leading edge voltage spike 402 and a substantially flat conducting period 404, but does not include a trailing-edge voltage spike, as shown for each half-cycle depicted in FIG. 3B. In other words, the rectifier switch 228a is disabled at a time $t_1'$ that is later than the time $t_1$ at which the rectifier switches of FIG. 3B are otherwise disabled, thereby suppressing the trailing-edge voltage spike (labeled as a smooth trailing-edge 408) that would otherwise occur. The trailing-edge voltage spike is suppressed because the rectifier diode does not conduct current since the current has crossed zero (e.g., reversed) at the time the rectifier switch is turned off. This delay, shown in FIG. 4B as the delay 410, allows the induced current to briefly continue into the opposite half-cycle, reversing direction, and causing power to be reflected to the source device 202.

In some embodiments, the processor 220 may perform an operation to determine an optimal delay to implement in order to sufficiently suppress the trailing-edge voltage spike in a manner that can be detected by the load device 204. For example, the processor 220 may progressively increase the implemented delay until the source device 202 confirms that it is able to detect power reflected by the load device 204 and to obtain digital information therefrom.

In this manner, by selectively desynchronizing the synchronous rectifier 224 on a per half-cycle basis (or a slower rate for some embodiments), the load device 204 can communicate digital information to the source device 202.

Next, reference is made to the operation of the circuit of the example embodiment illustrated in FIG. 2 as it relates to in-band signal receiving from the source device. As noted above with respect to other example embodiments, it is appreciated that the operation of the particular illustrated embodiment and schematic diagram is a generalized to facilitate an understanding of the various embodiments described herein; other circuit topologies can operate in a different manner to affect in-band signaling from the load device to the source device than that described below.

Particularly, the source device 202 detects the presence or absence of a reduction in power transfer due to the momentary current reversal and corresponding power reflection and records the presence as a digital bit. In one embodiment, the presence or absence of reflected power is buffered by the source device 202 as a binary bit (e.g., present or not present). In other cases, the source device 202 can use, collect, store, forward, or ignore received bits in any other number of suitable ways. For example, the source device 202 can buffer, cache, store, recorded bits until a symbol, instruction, header, checksum, an end-of-message indication, or other data is received.

Figure 5A:
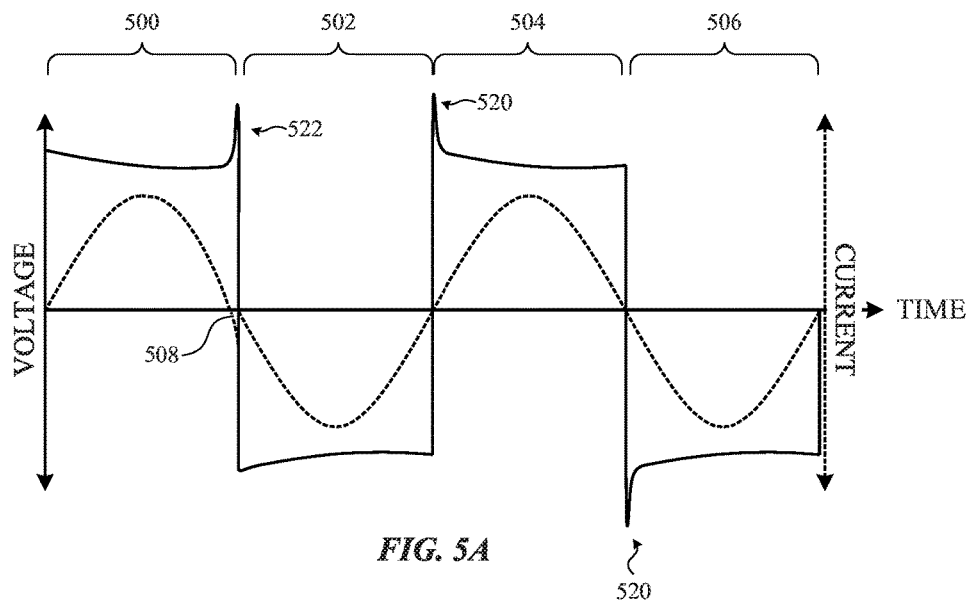
FIG. 5A is a waveform representation of current and voltage associated with a primary coil of the wireless power transfer system of FIG. 2, particularly illustrating a current reversal corresponding to the suppression of the trailing-edge voltage spike depicted in FIG. 4A.
Figure 5B:
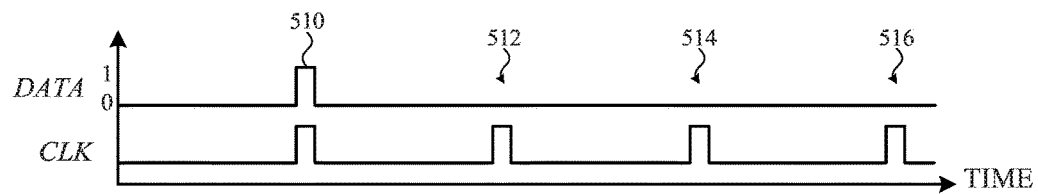
FIG. 5B is a timing diagram illustrating detection of the current reversal depicted in FIG. 5A.

For example, FIGS. 5A-5B is a waveform representation of the current and voltage measured across the output of the inverter 210 of FIG. 200. Depicted are periods of alternating current: a first positive half-cycle 500, a first negative half-cycle 503, a second positive half-cycle 504, and a second negative half-cycle 506. The depicted waveform also includes a current zero-crossing 508 immediately before the transition between the first positive half-cycle 500 and the first negative half-cycle 502. This current reversal is detectable by the processor 206 of the source device 202, and can be interpreted as a digital bit 510 such as shown in FIG. 5B. The current zero-crossing 508 can be any suitable current reversal (or, in some embodiments, current transitioning through a threshold) that is detectable by the processor 206.

In some embodiments that utilize dead-time control for inverter switches of an inverter of a source device, the associated inverter diodes (such as the inverter diodes 214a and 214d or 214b and 214c as shown in FIG. 2) may carry the current within the primary coil during the dead-time interval. In embodiments where active switches are turned off prior to the current within the primary coil reaching zero, the inverter diodes associated with the inactive switch pair will conduct until the current reaches zero.

As an example, reference is made to the embodiment depicted in FIG. 2. In this case, if the inverter switches 212a and 212d are turned off prior to zero current carried therethrough, then the inverter diodes 214b and 214c will conduct until the current reaches zero or until the inverter switches 212b and 212c are turned on. In this case, a leading-edge voltage spike 520 associated with the inverter diode conduction appears at the switches as depicted in FIG. 5A.

In the case where the current changes sign prior to the time when the active inverter switches are turned off, the inverter diodes associated with the recently active switch will conduct to carry the winding current until the opposite switch phase is turned on. In this case a trailing-edge voltage spike 522 associated with the inverter diode conduction would appear at the inverter switches, such as depicted in FIG. 5A. As an example, if the inverter switches 212a and 212d of FIG. 2 are turned off after the current changes sign then inverter diodes 214a and 214d will conduct until the inverter switches 212b and 212c are turned on.

At the time the inverter switches 212b and 212c are turned on (while the inverter diodes 214a and 214d are conducting) there may be a brief interval of reverse recovery shoot-through current carried until the associated inverter diodes turn off. The peak current and associated power loss associated with this shoot-though is, in many examples, dependent on the reverse recovery time of the inverter diodes. This reverse recovery shoot-through can also occur on the opposite inverter cycle when the inverter switches 212a and 212d are turned on (while the inverter diodes 214b and 214c are conducting) until the associated inverter diodes turn off. Some embodiments may utilize separate high-speed Schottky inverter diodes to minimize the peak current and losses associated with the reverse recovery time, thereby preventing said current from causing damage to one or more of the inverter switches 212a, 212b, 212c, and 212d.

In some embodiments, the digital bit 510 may be set at the moment the trailing-edge voltage spike 522 is detected by the processor 206 at the completion of half-cycle 500.

Conversely, another digital bit 512, having a different value than the digital bit 510, is set at the half-cycle 502 completes without experiencing a trailing-edge voltage pulse. Similarly, another digital bit 514, having a different value than the digital bit 510, may be set at the moment the second positive half-cycle 504 completes without experiencing a trailing-edge voltage pulse. Similarly, another digital bit 516, having a different value than the digital bit 510, is set at the moment the second negative half-cycle 506 completes without experiencing a trailing-edge voltage pulse. In this manner, through two periods of alternating current (e.g., inverter cycles), the load device 204 communicates four bits of information to the source device 202. For example, in the illustrated embodiment, the binary information communicated from the load device 204 to the source device 202 can be a binary representation of the number eight, $(1000)_2$.

In one example, the processor 206 of the source device 202 monitors for changes in current through one or more of the inverter switches 212a, 212b, 212c, and 212d of the inverter 210. Particularly, when a reduction in power transferred occurs, current through one or more of the inverter switches 212a, 212b, 212c, and 212d is reduced. The processor 206 can monitor for this reduction by determining whether the current through an inverter switch is lower than a selected threshold. In other cases, the processor 206 can monitor a voltage across an element of known resistance.

In other cases, the processor 206 of the source device 202 can monitor the current over time through one or more of the inverter switches 212a, 212b, 212c, and 212d for a phase shift and record the phase shift as a binary bit. In other cases, the source device 202 can monitor the magnitude of the reduction in power transferred (e.g., current monitoring, voltage monitoring, phase shift monitoring, and so on) and can quantize the same into one or more non-binary values.

Figure 6A:
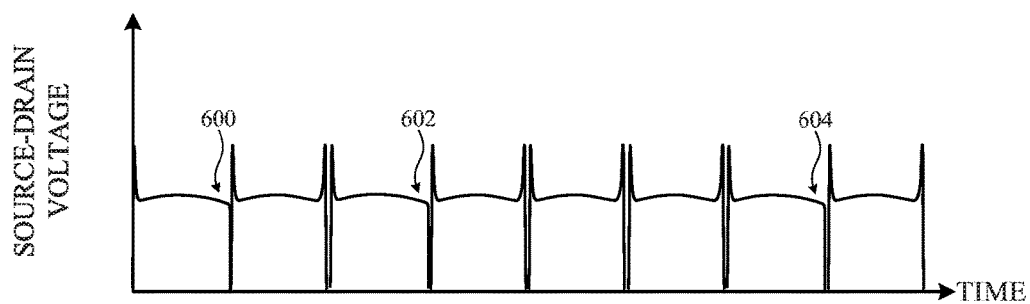
FIG. 6A is a waveform representation of voltage output from the synchronous rectifier of FIG. 2, illustrating in-band signaling via trailing-edge voltage spike suppression.
Figure 6B:
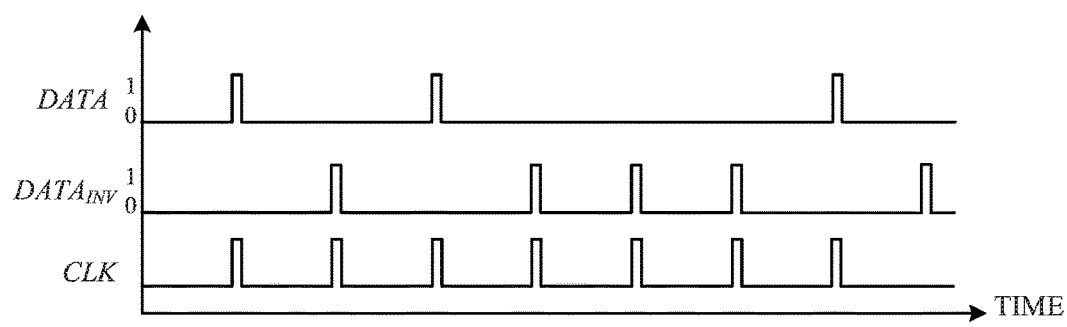
FIG. 6B is a timing diagram illustrating detection of current reversals corresponding to the trailing-edge voltage spike suppression depicted in FIG. 6A.

Alternatively, should the source device 202 detect the absence of any reduction in power transferred, the source device 202 buffers the absence of reduction in power transferred as a complementary digital bit. The source device buffers recorded bits until a symbol, instruction, header, or other data is received. For example, FIG. 6A depicts a waveform representation of voltage output from the synchronous rectifier 224 of FIG. 2, illustrating in-band signaling via trailing-edge voltage spike suppression. Illustrated are eight half-cycles, showing three suppressed trailing edge spikes, 600, 602, and 604. As with other embodiments described herein, the processor 206 of the source device 202 can monitor for the reductions in power transferred associated with the three suppressed trailing edge spikes, 600, 602, and 604 and can interpret said reductions in power transferred as a digital bits such as shown in FIG. 6B. In the embodiment depicted in FIG. 6B, the binary information communicated from the load device 204 to the source device 202 can be a binary representation of the number 162, $(1010\ 0010)_2$. In some cases, the processor 206 interprets the presence of a reduction in power transferred as an asserted binary bit (e.g., 1) and the absence of a reduction in power transferred as a null binary bit (e.g., 0). In other cases, the processor 206 interprets the absence of a reduction in power transferred as an asserted binary bit and the presence of the reduction in power transferred as a null binary bit. In further embodiments, the coding scheme of the in-band signaling between the load device 204 and the source device 202 can change depending upon the power requirements of the load device 204.

In this manner, digital information is transferrable from a load device to a source device via in-band signaling at a baud rate equivalent to, or a multiple or factor of, the operational frequency of the wireless power transfer system. As noted above, a load device selectively modifies the timing of (e.g., delays, phase shifts, and so on) a rectifier within the load device during a transition from a one half-cycle to the other half-cycle, thereby causing a reduction in the power transferred from the source device to the load device.

Figure 7A:
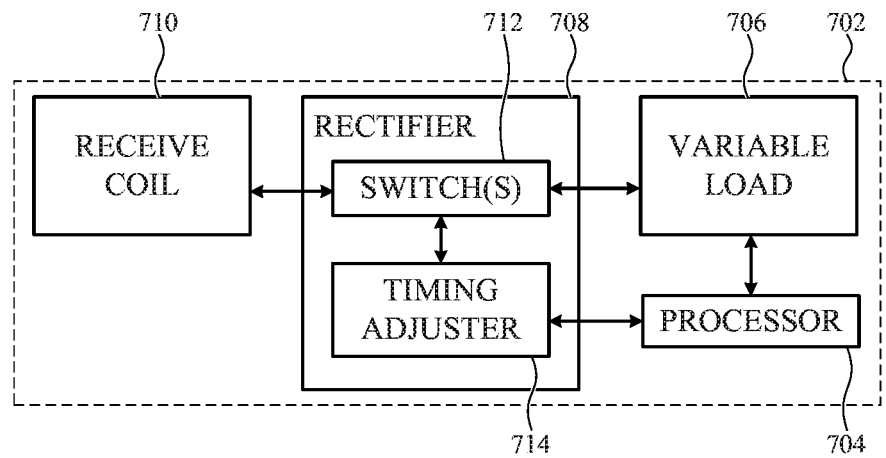
FIG. 7A is a simplified system diagram of a load device of a wireless power transfer system facilitating in-band signaling.
Figure 7B:
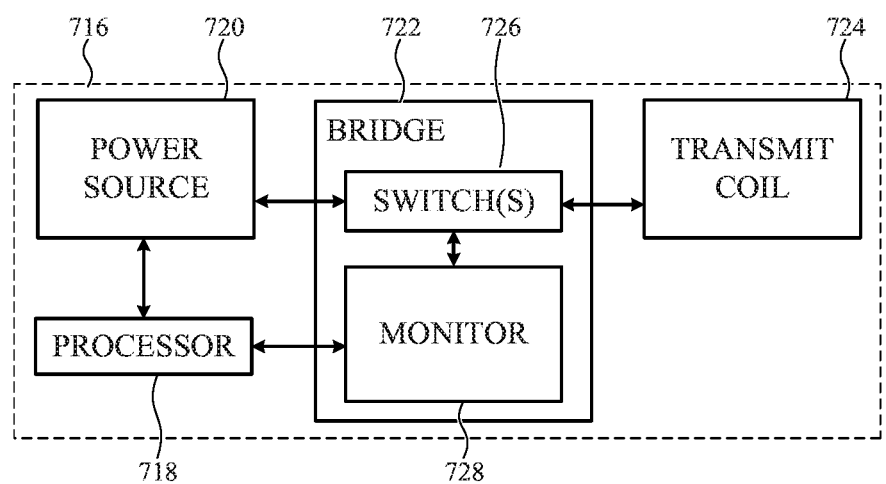
FIG. 7B is a simplified system diagram of a source device of a wireless power transfer system facilitating in-band signaling.

A more general representation of wireless power transfer system embodiments configured for in-band communication from the load device to a source device are depicted in FIGS. 7A-7B. FIG. 7A is a simplified system diagram of a load device 702 of a wireless power transfer system facilitating in-band signaling. The load device 702 includes a processor 704 to perform, monitor, and/or coordinate the operations of the load device 702. The processor 704 is coupled to a variable load 706 which itself is coupled to a rectifier 708 that receives alternating current from a receive coil 710. The receive coil 710 receives power from a source device. The rectifier 708 is controlled, at least partially, by a timing adjuster 714. The timing adjuster 714 responds to a data signal from the processor 704 to selectively modify the timing (e.g., turn-off, turn-on) of one or more switches 712 of the rectifier 708. In some cases, the timing adjuster 714 is a portion of the processor 704, in other cases, the timing adjuster 714 is implemented as a separate circuit and/or processor. In some cases, the delay (or phase shift) provided by the timing adjuster 714 is configurable by the processor 704.

FIG. 7B is a simplified system diagram of a source device 716 of a wireless power transfer system facilitating in-band signaling. The source device 716 includes a processor 718 coupled to a power source 720. The power source 720 supplies power to a bridge inverter 722 that outputs alternating current to a transmit coil 724. The bridge inverter 722 also includes a monitor 728 that is configured to monitor the magnitude and/or phase of current or voltage of one or more switches 726 of the bridge inverter 722.

Figure 8:
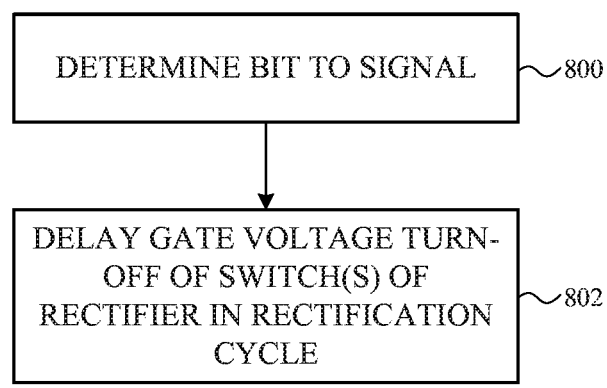
FIG. 8 depicts operations of a method of in-band signaling from a load device to a source device of a wireless power transfer system.

FIG. 8 depicts operations of a method of in-band signaling from a load device to a source device of a wireless power transfer system. The method begins at operation 800 in which a load device determines information (e.g., a data signal) that the load device desires to communicate to a source device over a wireless power transfer interface. The information communicated from the load device to the source device can be any suitable information. For example, the load device can communicate that a battery within the load device is fully charged. The load device can communicate that the load device is in need or more power. The load device can communicate a temperature of the load device. The load device can communicate authentication information to the source device. It is appreciated that the above are merely examples; a load device can communicate any suitable or implementation-specific information to a source device in different embodiments.

Next at operation 802, the load device causes a delay (and/or phase shift) in the gate voltage turn-off of one switch of a rectifier during a particular rectification cycle. The delay causes a reduction in power transferred across the wireless power transfer interface.

Figure 9:
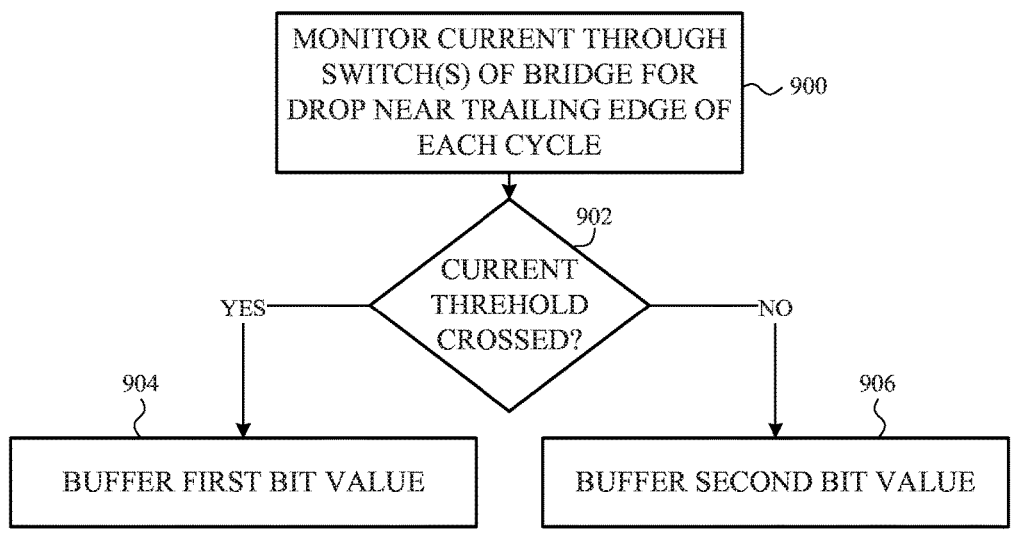
FIG. 9 depicts operations of a method of demodulating an in-band signal from a load device to a source device of a wireless power transfer system.

FIG. 9 depicts operations of a method of demodulating an in-band signal from a load device to a source device of a wireless power transfer system. The method begins at operation 900 in which a source device monitors current through one or more switches of an inverter bridge. The source device monitors for a current reversal (or, more generally, a current threshold crossing) that is associated with a reduction in power transferred from a load device. If a current reversal is detected at operation 902, then a first bit value is buffered within the source device at operation 904. Alternatively, if a current reversal is not detected at operation 902, then a second bit value is buffered within the source device at operation 906. Bits may be buffered until a pattern of bits is received. Thereafter, the pattern can be interpreted by a processor as data received from the load device.

Figure 10:
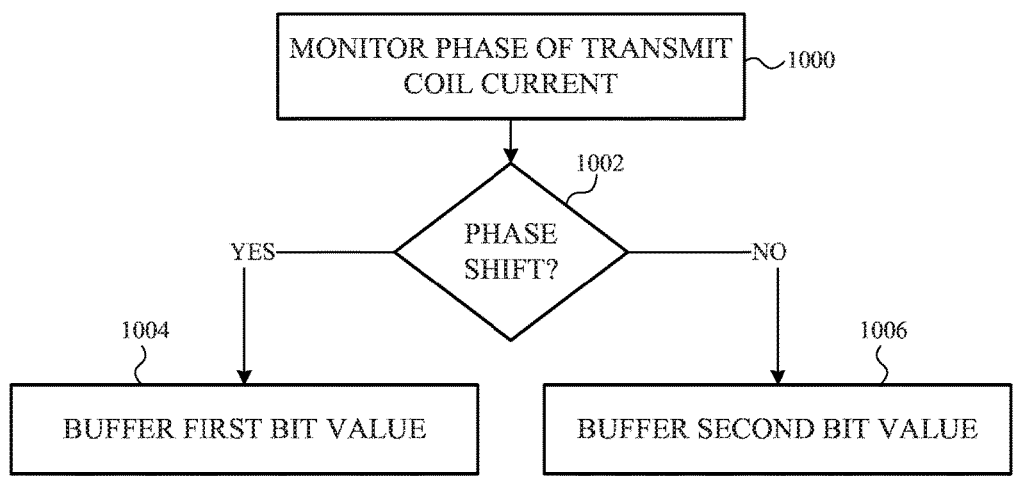
FIG. 10 depicts operations of another method of demodulating an in-band signal from a load device to a source device of a wireless power transfer system.

FIG. 10 depicts operations of a method of demodulating an in-band signal from a load device to a source device of a wireless power transfer system. The method begins at operation 1000 in which a source device monitors the phase of current through a transmit coil within the source device. The source device monitors for a phase shift that is associated with a reduction in power transferred to a load device. If a phase shift is detected at operation 1002, then a first bit value is buffered within the source device at operation 1004. Alternatively, if a phase shift is not detected at operation 1002, then a second bit value is buffered within the source device at operation 1006.

Figure 11:
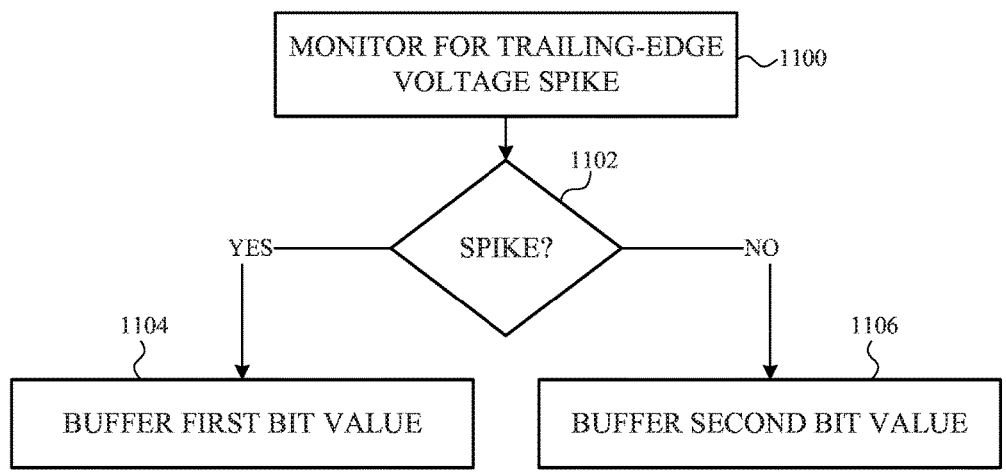
FIG. 11 depicts operations of another method of demodulating an in-band signal from a load device to a source device of a wireless power transfer system.

FIG. 11 depicts operations of a method of demodulating an in-band signal from a load device to a source device of a wireless power transfer system. The method begins at operation 1100 in which a source device monitors for a trailing edge voltage spike at a transmit coil within the source device. The source device monitors for a trailing edge voltage spike that is associated with diode conduction due to current reversal due to timing modifications in the load device. If a for a trailing edge voltage spike is detected at operation 1102, then a first bit value is buffered within the source device at operation 1104. Alternatively, if a trailing edge voltage spike is not detected at operation 1102, then a second bit value is buffered within the source device at operation 1106.

Figure 12:
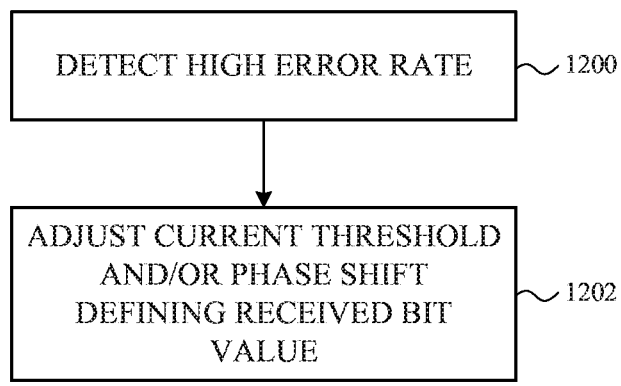
FIG. 12 depicts operations of a method of adjusting the data transfer rate of in-band signaling from a load device to a source device of a wireless power transfer system.

FIG. 12 depicts operations of a method of adjusting the data transfer rate of in-band signaling from a load device to a source device of a wireless power transfer system. The method begins at operation 1200 at which a high error rate in an in-band signaling channel is detected by a source device. The high error rate can be detected by any suitable error detection means.

If a high error rate is detected, the method continues to operation 1202 in which a current threshold for current reversal and/or phase shift defining a reduction in power transferred are either increased or decreased. If the error rate continues to increase, the threshold can be changed in the opposite direction. Once a minimum error rate is established, the source device can save the threshold value in a memory for future use.

One may appreciate that although many embodiments are disclosed above, that the operations and steps presented with respect to methods and techniques described herein are meant as exemplary and accordingly are not exhaustive. One may further appreciate that alternate step order or, fewer or additional steps may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method of operating a wireless power transfer system comprising a source device and a load device, the method comprising:
   transferring power from the source device to the load device; and
   during power transfer from the source device to the load device:
      determining, by the load device, a data signal comprising a series of digital bits to be communicated to the source device; and
      modifying a timing, by the load device, of a switch of a synchronous rectifier within the load device to desynchronize the synchronous rectifier in a pattern corresponding to the series of digital bits.

2. The method of claim 1, wherein the modification of the timing of the switch of the synchronous rectifier is a timing adjustment and comprises delaying a turn-off of the switch until after a zero-crossing of an induced current.

3. The method of claim 2, wherein the timing adjustment comprises delaying a turn-off time of the switch so that current through the switch reverses.

4. The method of claim 2, wherein the timing adjustment is configured to suppress a voltage spike associated with current conduction through a diode within the load device.

5. The method of claim 4, wherein the diode is coupled in parallel with the switch.

6. The method of claim 4, wherein:
   the switch is a transistor; and
   the diode is a body diode incorporated within the transistor.

7. The method of claim 4, wherein:
   the switch is a transistor; and
   the diode is a Schottky diode coupled across a source and a drain of the transistor.

8. The method of claim 2, wherein the timing adjustment is performed by a timing adjuster.

9. A method for operating a wireless power transfer system that includes a source device and a load device, the method comprising:
   transferring power from the source device to the load device; and
   during power transfer from the source device to the load device:
      determining, by the source device, whether a current threshold crossing has occurred or has not occurred within an electronic element of the source device at a time corresponding to an edge of one half-cycle of an inverter of the source device; and
      buffering, by the source device, a series of digital bits corresponding to a data signal sent from the load device to the source device, each digital bit of the series of digital bits corresponding to a respective determined occurrence or a respective determined absence of occurrence of a respective current threshold crossing.

10. The method of claim 9, wherein the source device comprises a bridge inverter; and
   the operation of determining, by the source device, whether the current threshold crossing has occurred within the electronic element of the source device comprises monitoring a switch of the bridge inverter for a drop in current.

11. The method of claim 10, wherein the operation of monitoring the switch of the bridge inverter for the drop in current comprises:
   measuring a current through the switch; and
   comparing the current to a threshold value.

12. A method for operating a wireless power transfer system that includes a source device and a load device, the method comprising:
   transferring power from the source device to the load device; and
   during power transfer from the source device to the load device:
      determining, by the source device, whether a phase shift has occurred in an alternating current passing through an electronic element of the source device; and
      buffering, by the source device, a digital bit for each determined phase shift and a complimentary digital bit for each determined absence of phase shift.

13. The method of claim 12, wherein the source device comprises a bridge inverter; and
   the operation of determining, by the source device, that the phase shift has occurred in the alternating current passing through the electronic element of the source device comprises:
      monitoring a phase of current passing through the bridge inverter for a change.

14. The method of claim 13, wherein the operation of monitoring a phase of current passing through the bridge inverter for the change comprises:
   measuring a phase of alternating current passing through the bridge inverter; and
   comparing the phase to a threshold value.

15. A wireless power transfer system, comprising:
   a source device comprising:
      a bridge inverter comprising a first set of switches;
      a transmit coil coupled to an output of the bridge inverter; and
      a first processor configured to monitor a first electrical characteristic of the bridge inverter during operation of the bridge inverter; and
   a load device aligned with the source device, the load device comprising:
      a receive coil;
      a bridge rectifier coupled to an output of the receive coil, the bridge rectifier comprising a second set of switches; and
      a second processor coupled to the bridge rectifier; wherein
   the second processor is configured to perform a sequence of timing modifications, each timing modification comprising a delay of a turn-off of at least one switch of the second set of switches and based, at least in part, on a digital bit of a data signal to be communicated to the source device.

16. The wireless power transfer system of claim 15, wherein the first electrical characteristic comprises a voltage spike across at least one switch of the first set of switches.

17. The wireless power transfer system of claim 15, wherein the first electrical characteristic comprises a phase shift in at least one of a voltage or a current across at least one of the switches of the first set of switches.

18. The wireless power transfer system of claim 15, wherein the first processor is configured to obtain the data signal by monitoring the first electrical characteristic.

19. The wireless power transfer system of claim 15, wherein at least one switch of the first set of switches is a transistor that incorporates a body diode.

20. The wireless power transfer system of claim 15, wherein the load device is a wearable electronic device.

* * * * *